UNITED STATES PATENT OFFICE.

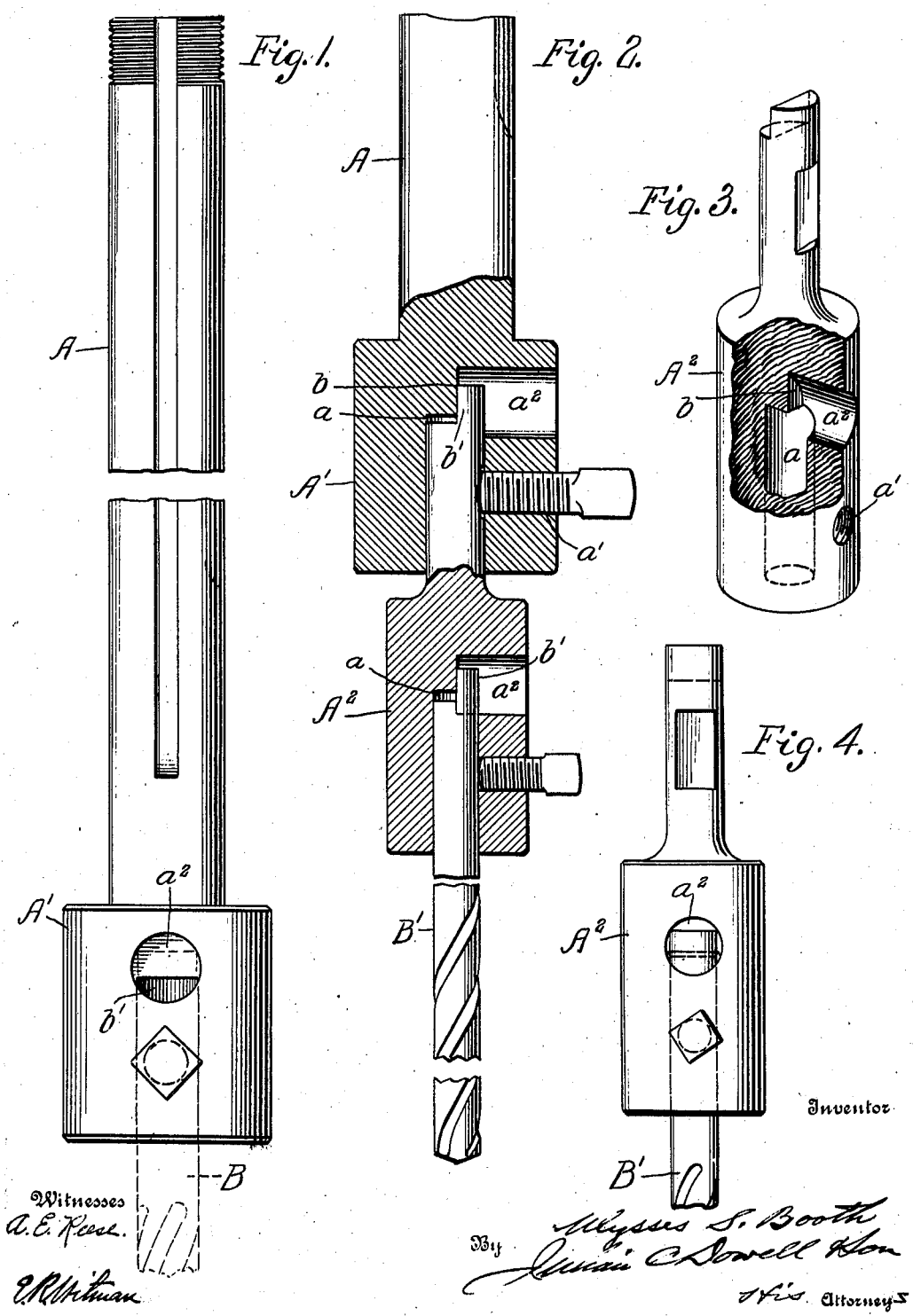

ULYSSES SILAS BOOTH, OF PORTLAND, OREGON, ASSIGNOR TO THE CHAMPION BLOWER & FORGE COMPANY, OF LANCASTER, PENNSYLVANIA, A CORPORATION OF PENNSYLVANIA.

DRILL-BIT HOLDER.

No. 857,151.  Specification of Letters Patent.  Patented June 18, 1907.

Application filed February 26, 1907. Serial No. 359,444.

*To all whom it may concern:*

Be it known that I, ULYSSES SILAS BOOTH, a citizen of the United States, residing at Portland, in the county of Multnomah and State of Oregon, have invented certain new and useful Improvements in Drill-Bit Holders; and I do hereby declare the following to be a full, clear, and exact description of the invention, such as will enable others skilled in the art to which it appertains to make and use the same.

This invention relates to drilling machines, and more particularly to drill-bit holders or means for fastening the shank of a drill-bit or similar tool to a drill spindle or chuck in such manner as to prevent the bit or tool from turning, slipping or becoming loose and dropping out.

The invention will first be hereinafter more particularly described, with reference to the accompanying drawings, which are to be taken as a part of this specification, and then pointed out in the claims at the end of the description.

In said drawings, Figure 1 represents a front elevation of a drill spindle having a chuck or socketed head on its lower end embodying my invention; Fig. 2 is a longitudinal sectional elevation of the chuck or drill-bit holder on the lower end of a drill spindle having an auxiliary chuck or drill-bit holder attached thereto and illustrating another application of my invention. Fig. 3 is a perspective sectional view of the auxiliary chuck or drill-bit holder; and Fig. 4 is a front elevation of said auxiliary chuck detached from the drill spindle.

In said drawings, in which similar letters of reference are used to denote corresponding parts in different views, the letter A denotes a drill stock or spindle, which may consist of a straight piece of cold rolled shafting, of any desired length and diameter, adapted for connection with the co-operating parts of a drilling machine by having its upper end threaded and a longitudinal groove or key-way therein extending the greater part of its length, and provided at its lower end with an enlarged head or chuck A' in which a drill bit or other tool is secured; said head preferably consisting of cast or wrought iron, which may be shrunk on the end of the drill spindle, and longitudinally bored or socketed as at $a$ to receive the shank of a drill-bit or other tool and also tapped as at $a'$ for the insertion of a set screw to engage the shank of the drill-bit and prevent the same from slipping or dropping out, which is a common feature in this class of machines.

In order to prevent the drill-bit from turning as well as to prevent it from slipping and dropping out, I provide a bore as at $a^2$ extending transversely part way through the head or chuck to a point about midway thereof, preferably, and terminating about midway of the longitudinal bore, which also terminates about midway, preferably, of said transverse bore, so as to form a shoulder $b$ where the two bores intersect having a flattened surface for engagement with the flattened surface of a semi-cylindrical end-portion $b'$ of the shank of a drill-bit B, whereby the latter, when properly seated within the longitudinal bore of the chuck and fastened by means of the set screw or other fastening device, will be securely locked against rotation as well as against endwise or longitudinal movement.

It has heretofore been proposed to provide a chuck or tool holder with a socket which is angular in cross-section to receive a correspondingly shaped shank of a drill bit or other tool, and to secure the same within the socket by means of a set screw, so as to prevent rotary or longitudinal movement, and it has also been proposed to cut away the body of a chuck having a longitudinal bore or socket therein so as to provide a flat surface to engage a correspondingly flattened end of the shank of the tool protruding through said socket, but such methods of construction are objectionable as they add considerably to the cost of production and are more or less inefficient and unsatisfactory in use, especially in those cases in which the body of the chuck is cut away with consequent weakening of the structure.

My improved chuck combines simplicity, strength and efficiency, without the disadvantages of weakening the body of the chuck by cutting away a part thereof, as in the class of devices above mentioned, and it has the further advantage of being inexpensive in construction, as it is only necessary to bore or drill two holes at right angles to each other in the enlarged head or boss on the lower end of the drill spindle, the bore in each instance terminating part way of the bore which it intersects, thus dispensing with the nicety and exactness usually required in fitting and adapting the parts to co-operate in producing the desired result.

The letter A² denotes an auxiliary chuck having its shank constructed to fit the bore of the socketed head or chuck A on the end of the drill spindle and take the place of a drill-bit or other tool secured therein: said auxiliary chuck being provided with a longitudinal and transverse bore having a flattened portion therein as described with reference to the socketed head or chuck on the drill spindle, so as to adapt the said auxiliary chuck to receive a drill-bit or other tool secured therein in the same manner that the shank of the auxiliary chuck is itself secured to the socketed head or chuck on said drill spindle.

By means of the auxiliary chuck I may use on the same machine a drill-bit or other tool having a shank of larger or smaller size than the shank of the drill-bit or other tool which is ordinarily used with such machine; the shank of the auxiliary chuck being adapted to fit interchangeably with the shank of the drill-bit which is ordinarily employed on a given machine. For instance, if the chuck on the drill spindle is not of standard size and the shank of the drill-bit is adapted to fit an opening or bore which is only one-half inch in diameter, and the operator desires to use a drill-bit having a shank which is 5/8 of an inch or 41/64 of an inch in diameter, the drill-bit may be removed from the chuck on the drill spindle and the shank of the auxiliary chuck secured in its place; the latter having a socket or bore adapted to receive the desired size of drill-bit of greater or less diameter, as the case may be, than the drill-bit removed from the chuck on the drill spindle, thus enabling the operator to use tools of different sizes with the same drill spindle. The sizes may be varied, of course, to suit different requirements, the object being to provide means for attaching drill-bits of different sizes to a drill spindle of a standard size.

Having thus described my invention what I claim as new and desire to secure by Letters Patent of the United States, is:—

1. A drill-bit holder or chuck comprising a suitable head on or adapted for attachment to a drill spindle, said head having a longitudinal bore or socket and a transverse bore or socket intersecting the former, each bore terminating part way of the bore which it intersects, so as to provide a shoulder within the head having a flattened surface or seat for engagement with the flattened end of a drill-bit shank.

2. A drill-bit holder or chuck comprising a suitable head on or adapted for attachment to a drill spindle, said head having a longitudinal bore or socket and a transverse bore or socket intersecting the former, each bore terminating part way of the bore which it intersects, so as to provide a shoulder within the head having a flattened surface or seat for engagement with the flattened end of a drill-bit shank, and means adapted to secure the flattened end of the shank in engagement with said seat.

In testimony whereof I affix my signature, in presence of two witnesses.

ULYSSES SILAS BOOTH.

Witnesses:
 E. L. JOHNSTON,
 J. E. MAGERS.